US009049646B2

(12) United States Patent
Al-Khudairi et al.

(10) Patent No.: US 9,049,646 B2
(45) Date of Patent: Jun. 2, 2015

(54) METHODS AND APPARATUS FOR NETWORK SEARCHING

(71) Applicant: BlackBerry Limited, Waterloo (CA)

(72) Inventors: Abdul-Munem Al-Khudairi, Mississauga (CA); Johanna Lisa Dwyer, Brookline, MA (US)

(73) Assignee: BlackBerry Limited, Waterloo, Ontario (CA)

( * ) Notice: Subject to any disclaimer, the term of this patent is extended or adjusted under 35 U.S.C. 154(b) by 225 days.

(21) Appl. No.: 13/624,554

(22) Filed: Sep. 21, 2012

(65) Prior Publication Data

US 2013/0109377 A1 May 2, 2013

Related U.S. Application Data

(60) Provisional application No. 61/554,240, filed on Nov. 1, 2011.

(51) Int. Cl.

| | |
|---|---|
| ***H04W 4/00*** | (2009.01) |
| ***H04W 48/16*** | (2009.01) |
| *H04W 48/18* | (2009.01) |

(52) U.S. Cl.

CPC .............. *H04W 48/16* (2013.01); *H04W 48/18* (2013.01)

(58) Field of Classification Search

USPC ........ 455/432.1, 433, 435.1–435.3, 439, 444, 455/456.1; 370/328, 331–334

See application file for complete search history.

(56) References Cited

U.S. PATENT DOCUMENTS

| | | | | |
|---|---|---|---|---|
| 6,282,419 | B1 * | 8/2001 | Findikli | 455/434 |
| 7,869,826 | B2 * | 1/2011 | McElwain et al. | 455/551 |
| 2005/0176424 | A1 | 8/2005 | Kumar et al. | |
| 2005/0254469 | A1 * | 11/2005 | Verma et al. | 370/338 |
| 2006/0172735 | A1 * | 8/2006 | Buckley et al. | 455/434 |
| 2006/0246890 | A1 * | 11/2006 | Yasuda et al. | 455/425 |
| 2007/0287419 | A1 * | 12/2007 | Wang | 455/411 |
| 2009/0170507 | A1 * | 7/2009 | Kim | 455/433 |

(Continued)

FOREIGN PATENT DOCUMENTS

| | | |
|---|---|---|
| EP | 1045608 | 10/2000 |
| EP | 1469696 | 10/2004 |

(Continued)

OTHER PUBLICATIONS

Patent Cooperation Treaty, "International Search Report", issued in connection with PCT application No. PCT/US2012/062805, mailed Jan. 22, 2013 (5 pages).

Patent Cooperation Treaty, "Written Opinion", issued in connection with PCT application No. PCT/US2012/062805, mailed Jan. 22, 2013 (9 pages).

(Continued)

*Primary Examiner* — Dai A Phuong

(74) *Attorney, Agent, or Firm* — Fish & Richardson P.C.

(57) ABSTRACT

Methods and apparatus for network searching are disclosed. An example method is performed by a mobile device related to public land mobile network (PLMN) selection, the method comprising registering with a visited PLMN, determining whether a priority search inhibit list includes a cell global identity of a serving cell, dependent at least in part on determining that the priority search inhibit list does not include the cell global identity of the serving cell and dependent at least in part on a priority search period, searching for a second PLMN having a higher priority than the visited PLMN, and dependent at least in part on the searching being unsuccessful, adding the cell global identity of the serving cell to the priority search inhibit list.

39 Claims, 8 Drawing Sheets

(56) References Cited

U.S. PATENT DOCUMENTS

| | | | | |
|---|---|---|---|---|
| 2009/0196265 | A1* | 8/2009 | Mariblanca Nieves et al. | 370/338 |
| 2009/0215447 | A1* | 8/2009 | Catalano et al. | 455/432.1 |
| 2010/0075658 | A1* | 3/2010 | Hou et al. | 455/422.1 |
| 2010/0203865 | A1* | 8/2010 | Horn et al. | 455/411 |
| 2010/0261478 | A1* | 10/2010 | Schmidt et al. | 455/445 |
| 2010/0323663 | A1* | 12/2010 | Vikberg et al. | 455/410 |

FOREIGN PATENT DOCUMENTS

| | | |
|---|---|---|
| GB | 2369265 | 5/2002 |
| GB | 2434055 | 7/2007 |
| WO | 01/17125 | 3/2001 |
| WO | 2004066663 | 8/2004 |

OTHER PUBLICATIONS

3GPP, "3rd Generation Partnership Project; Technical Specification Group Core Network and Terminals; Non-Access Stratum (NAS) functions related to Mobile Station; (MS) in idle mode", 3GPP TS 23.122, version 10.5.0, Sep. 2011 (44 pages).

European Telecommunications Standards Institute, "Digital Cellular Telecommunications system (Phase 2); Service Accessibility (GSM 02.11)", ETSI 300 507, Fourth Edition, Sep. 1996 (15 pages).

The International Bureau of WIPO, "International Preliminary Report on Patentability," issued in connection with Application No. PCT/US2012/062805, May 6, 2014, 9 pages.

European Patent Office, "Communication pursuant to Rules 161(1) and 162 EPC," issued in connection with Application No. 12787599. 5, Jul. 11, 2014, 2 pages.

* cited by examiner

METHODS AND APPARATUS FOR NETWORK SEARCHING

FIELD OF THE DISCLOSURE

This disclosure relates generally to mobile communications and, more particularly, to methods and apparatus for network searching.

BACKGROUND

Mobile communication devices (i.e., mobile stations) are associated with a home network. For example, a mobile telephone is associated with a particular mobile provider with which the owner of the mobile telephone has subscribed for service. The home network manages the subscriptions and credentials of the mobile communication devices. When a mobile communication device is outside of the coverage area of the home network, the mobile communication device can receive services via a roaming or visited network. As part of accepting a mobile station, the roaming network communicates with the home network of the mobile station to verify the credentials of the mobile communication device owner and to verify that the home network will compensate the roaming network for the usage by the mobile communication device.

Home network operators have preferences regarding which roaming networks their subscribers utilize. For example, when a mobile communication device is roaming in a country in which the home network does not provide service, two roaming networks may be available and the home network may have an interest in the mobile communication device connecting to particular one of the roaming networks. For example, the home network may have a contractual agreement with the particular one of the roaming networks. The roaming network preferences of the home operator (in terms of a PLMN (Public Land Mobile Network) identity and access technology combination) are stored in priority order in the $EF_{OPLMNwACT}$ (Operator controlled PLMN selector with Access Technology) data file in the subscriber identity module (SIM) (described in Section 4.2.53 of 3GPP TS 31.102). This list is used in automatic network selection of a roaming network (as described in Section 4.4.3.1.1 of 3GPP TS 23.122).

Another method for a home network to direct a mobile communication device to a desired roaming network is called Steering of Roaming, and is described in Section 4.4.6 of 3GPP TS 23.122. According to the steering operation, the $EF_{OPLMNwACT}$ (Operator controlled PLMN selector with Access Technology) data file in the subscriber identity module (SIM) of a mobile communication device can be updated through the use of a USAT REFRESH command qualifier (as described in 3GPP TS 31.111) of type “Steering of Roaming”, and a new scan is triggered. The mobile communication device then uses the updated priority list when selecting a roaming service provider.

When in a visited network, a mobile station periodically scans to identify available networks within range of the mobile station. The results of the scan may cause the mobile station to change its connection from a first visited network to a second visited network if the second visited network has a higher priority than the first network according to the $EF_{OPLMNwACT}$.

DETAILED DESCRIPTION

Figure 1:
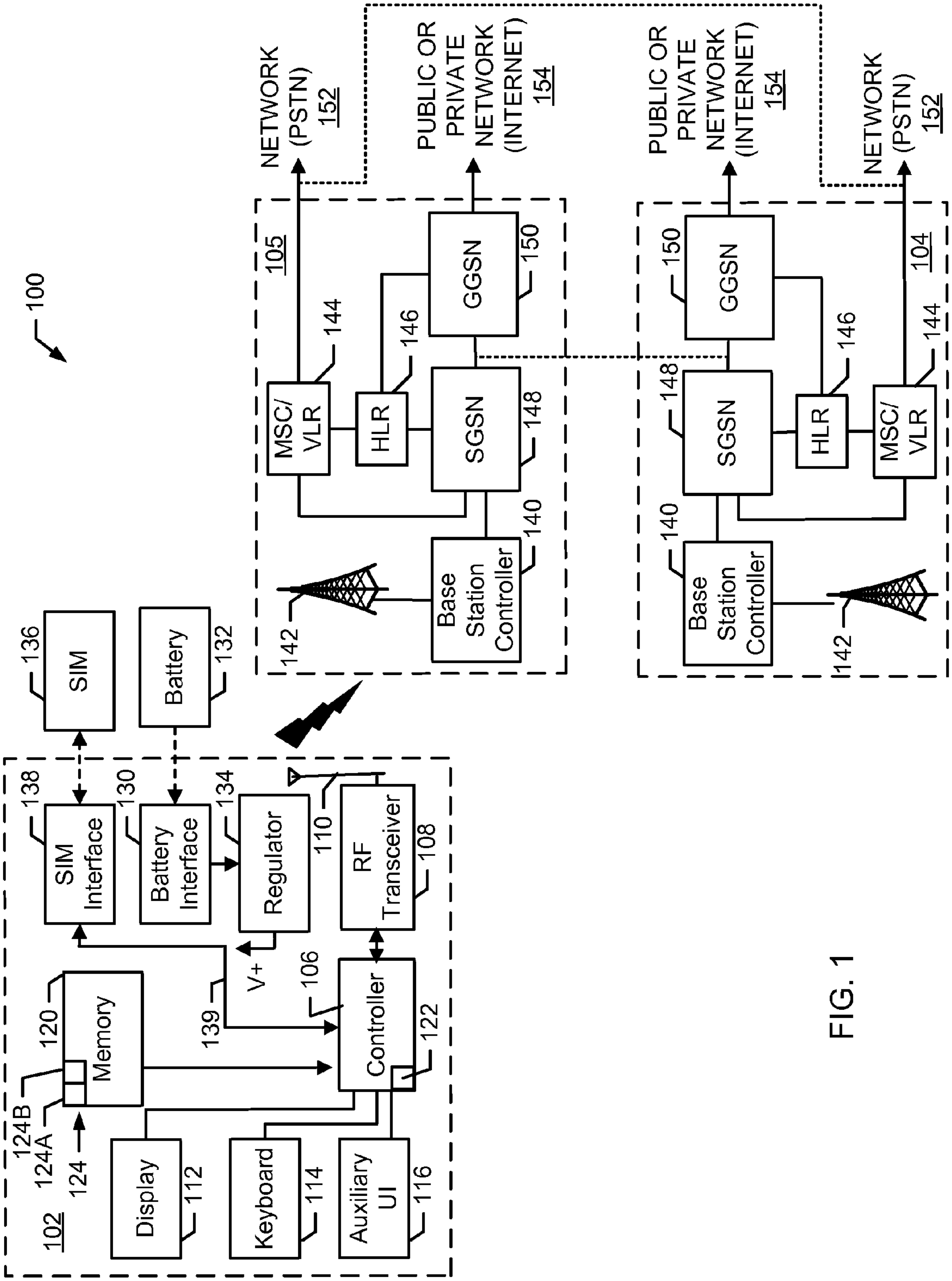
FIG. 1 is a block diagram of an example communication system that allows an operator to manage roaming mobile stations.

Methods, apparatus, and articles of manufacture for network searching are described herein. According to one example, a method performed by a mobile device related to public land mobile network (PLMN) selection, may include registering with a visited PLMN; determining whether a priority search inhibit list includes a cell global identity of a serving cell; dependent at least in part on determining that the priority search inhibit list does not include the cell global identity of the serving cell and dependent at least in part on a priority search period, searching for a second PLMN having a higher priority than the visited PLMN; and dependent at least in part on the searching being unsuccessful, adding the cell global identity of the serving cell to the priority search inhibit list.

Another example method includes a method performed by a mobile device related to public land mobile network (PLMN) selection. Such a method may include registering with a visited PLMN; determining whether a search inhibit list includes a cell global identity of a serving cell; dependent at least in part on determining that the search inhibit list does not include the cell global identity of the serving cell and dependent at least in part on a priority search period, searching for a second PLMN having a higher priority than the visited PLMN; and dependent at least in part on the searching being unsuccessful with respect to a home PLMN or an equivalent home PLMN, adding the cell global identity of the serving cell to the search inhibit list and refraining from attempting a further search for a second PLMN having a higher priority than the visited PLMN while on the serving cell for as long as the search inhibit list includes the cell global identity of the serving cell.

Another example method performed by a mobile device related to public land mobile network (PLMN) selection, includes registering with a visited PLMN; determining whether a search inhibit list includes an identification of a serving cell; and if the search inhibit list does not include an identification of the serving cell, searching for a second PLMN, and if a home PLMN (HPLMN) or an equivalent HPLMN ((E)HPLMN) is not found from the searching, storing an identification of the serving cell on the search inhibit list; or if the search inhibit list includes an identification of the serving cell, refraining from searching for a second PLMN regardless of a priority search period.

Another example method may be performed by a mobile device related to public land mobile networks (PLMN)s. Such a method may include registering with a visited PLMN; determining whether a priority search inhibit list includes an identification of a serving cell; and if the priority search inhibit list does not include an identification of the serving cell, searching for a second PLMN having a higher priority than the visited PLMN, and if a second PLMN having a higher priority than the visited PLMN is not found from the searching, storing an identification of the serving cell on the priority search inhibit list; or if the priority search inhibit list includes an identification of the serving cell, refraining from searching for a second PLMN having a higher priority than the visited PLMN regardless of a priority search period.

Another example method performed by a mobile device related to public land mobile networks (PLMN)s may include registering with a visited PLMN; determining whether a search inhibit list includes an identification of a cell; and if the search inhibit list does not include an identification of the cell, searching for a desired PLMN, and if a desired PLMN is not found from the searching, storing an identification of the cell on the search inhibit list; or if the search inhibit list includes an identification of the cell, refraining from searching for a desired PLMN regardless of a priority search period.

An example method performed by a wireless device may include registering with a network; determining whether a search inhibit list includes an identification of an access node; and if the search inhibit list does not include an identification of the access node, searching for a higher priority network, and if a higher priority network is not found from the searching, storing an identification of the access node on the search inhibit list; or if the search inhibit list includes an identification of the access node, refraining from searching for a higher priority network.

Turning to FIG. 1, a block diagram of an example communication system 100 implemented as described herein to allow management of the roaming of mobile communication devices is illustrated. According to the illustrated example, a mobile station connects to a network via an access node and scans to determine availability of higher priority networks. If the mobile station does not detect any higher priority networks, the mobile station updates a search inhibit list to include an indication of the access node therein. Thus, the mobile station may refrain from periodically searching for higher priority networks when connected to the access node because the mobile station previously determined that no higher priority networks were available.

FIG. 1 is a block diagram of a communication system 100, which includes the mobile station 102 (one type of user equipment, wireless or mobile communication device) that communicates through a wireless communication network 104 and/or a wireless communication network 105. According to the illustrated example, the wireless communication network 104 implements a home network (home public land mobile network (HPLMN)) and the wireless communication network 105 implements a visited network (visited public land mobile network (VPLMN)) that is a separate network from the home network. In other words, when the mobile station 102 is outside the area covered by the wireless communication network 104, the mobile station 102 will connect to the wireless communication network 105. The wireless communication network 105 will then communicate with the wireless communication network 104 to verify the credentials of the mobile station 102 and to provide services to the mobile station 102. An (E)HPLMN (equivalent HPLMN) is another network that can provide service to the mobile station in substantially the same manner as the HPLMN, for example without incurring roaming charges. HPLMN and (E)HPLMN relationships may occur as a result of network operator mergers, for example. While the term HPLMN is referenced herein, an (E)HPLMN may be used in any instance where an HPLMN is referenced and/or any combination of HPLMNs and (E)HPLMNs may be used.

In the example of FIG. 1, the mobile station 102 includes a controller 106, one or more radio frequency (RF) transceivers 108 and one or more associated antennas 110, a visual display 112, a keyboard 114, and perhaps one or more auxiliary user interfaces (UI) 116, all of which are coupled to the controller 106 and may be capable of communicating over multiple access technologies. In one example, the controller 106 is implemented using a central processing unit (CPU) that runs operating system software stored in a memory 120. The controller 106 will normally control overall operation of mobile station 102, whereas signal processing operations associated with communication functions are typically performed by the RF transceiver circuitry 108. The controller 106 interfaces with the display 112 to present received information, stored information, user inputs, and the like.

The example controller 106 includes a search manager 122 that manages how and when the mobile station 102 searches for networks. The search manager 122 maintains one or more search inhibit lists 124. In some examples, the search manager 122 may create the search inhibit list 124. In other examples, a network may provide the search inhibit list 124 in a download to the mobile station 102. Additionally, in some examples, the mobile station 102 may develop a search inhibit list 124 that the mobile station 102 uploads to a network.

In one example, the search inhibit list 124 may include a priority search inhibit list 124A or an (E)HPLMN search inhibit list 124B, or both. As explained below, the search inhibit list 124 may take different forms, such as a simple search inhibit list, a modified simple search inhibit list, and a full search inhibit list. The search inhibit list 124 may be provided by a network (e.g., the wireless communication networks 104, 105) or may be developed by the mobile station 102. While shown as being stored in the memory 120, the search inhibit list 124 may be stored in any suitable location in the mobile station 102 or on the SIM 136 (described below). Additionally, the search inhibit list 124 could be stored in a first memory location and copied to a cache or other location for use. Operation of the search manager 122 in maintaining the search inhibit list 124 is described below.

The keyboard 114, which may be a telephone type keypad or full alphanumeric keyboard, is normally provided for entering data for storage in the mobile station 102, information for transmission to the network 104, a telephone number to place a telephone call, commands to be executed on the mobile station 102, and possibly other or different user inputs.

Mobile station 102 sends communication signals to, and receives communication signals from the network 104 over a wireless link via the antenna 110. The RF transceiver circuitry 108 performs, for example, modulation/demodulation, encoding/decoding, and encryption/decryption. It will be apparent to those skilled in art that the one or more instances of RF transceiver circuitry 108 will be adapted to interoperate with any wireless network or networks in which mobile station 102 may operate.

The mobile station 102 further includes a battery interface 130 for receiving one or more rechargeable batteries 132. The battery 132 provides power to electrical circuitry in mobile station 102, and the battery interface 130 provides for a mechanical and electrical connection for the battery 132. The battery interface 130 is coupled to a regulator 134 that regulates power V+ to the device. When the mobile station 102 is operational, an RF transmitter of the RF transceiver circuitry 108 is typically keyed or turned on only when it is sending information to the network, and is otherwise turned off to conserve resources. Similarly, an RF receiver of the RF transceiver circuitry 108 is typically periodically turned off to conserve power until it is needed to receive signals or information (if at all) during designated time periods.

The mobile station 102 operates using a Subscriber Identity Module (SIM) 136 that is connected to or inserted in the mobile station 102 at a SIM interface 138. Without the SIM 136, the mobile station 102 may be referred to as mobile equipment (ME); with the SIM 136, the mobile station 102 may be referred to as user equipment (UE). The SIM 136 is one type of a removable memory module or "smart card" used to identify an end user of mobile station 102 (or subscriber) and to personalize the device, among other things. Without the SIM 136, the example mobile station 102 is not fully operational for communication through the wireless network 104. By inserting the SIM 136 into the mobile station 102, an end user can have access to any and all of his/her subscribed services.

The SIM 136 generally includes a processor and memory for storing information. Because the SIM 136 is coupled to the SIM interface 138, it is coupled to the controller 106 through communication lines 139. To identify the subscriber, the SIM 136 contains some user parameters such as an International Mobile Subscriber Identity (IMSI). An advantage of using the SIM 136 is that end users are not necessarily bound by any single physical mobile station because the SIM 136 may be used in any number of different mobile stations. The SIM 136 may store additional user information for the mobile station 102 as well, including datebook (or calendar) information, recent call information, and network connection information. Additionally, the SIM 136 may store the search inhibit list 124.

The mobile station 102 may be a single unit, such as a data communication device, a cellular telephone, a multiple-function communication device with data (e.g., electronic mail, internet access, personal information management, etc.) and voice communication capabilities, a personal digital assistant (PDA) enabled for wireless communication, or a computer incorporating an internal modem. Alternatively, the mobile station 102 may be a multiple-module unit comprising a plurality of separate components, including but in no way limited to a computer or other device connected to a wireless modem. In particular, for example, in the mobile station block diagram of FIG. 1, the RF transceiver circuitry 108 and antenna 110 may be implemented as a radio modem unit that may be inserted into a port on a laptop computer. In this case, the laptop computer would include the display 112, keyboard 114, one or more auxiliary UIs 116, and the controller 106 may be the computer's CPU. It is also contemplated that a computer or other equipment not normally capable of wireless communication may be adapted to connect to and effectively assume control of the RF transceiver circuitry 108 and the antenna 110 of a single-unit device such as one of those described above.

The mobile station 102 communicates in and through the wireless communication network 104 (e.g., a home network, HPLMN, for the mobile station 102), which may be a cellular telecommunications network. In the example of FIG. 1, the wireless network 104 is configured in accordance with General Packet Radio Service (GPRS) and a Global Systems for Mobile (GSM) technologies. The wireless network 104 may be configured according to any communication technology including, for example, universal mobile telecommunications system (UMTS), long term evolution (LTE), worldwide interoperability for microwave access (WiMAX), code division multiple access (CDMA), etc. While the following description references components of the wireless communication network 104, the wireless communication network 105 (e.g., a visited network, VPLMN, for the mobile station 102) may include the same, similar, or different components to implement a second node of the wireless communication network 104 or a second wireless communication network.

The wireless communication network 104 includes a base station controller (BSC) 140 with an associated tower station 142, a Mobile Switching Center (MSC) 144, a Home Location Register (HLR) 146, a Serving General Packet Radio Service (GPRS) Support Node (SGSN) 148, and a Gateway GPRS Support Node (GGSN) 150. The MSC 144 is coupled to the BSC 140 and to a landline network, such as a Public Switched Telephone Network (PSTN) 152. The SGSN 148 is coupled to the BSC 140 and to the GGSN 150, which is in turn coupled to a public or private data network 154 (such as the Internet). The HLR 146 is coupled to the MSC 146, the SGSN 148, and the GGSN 150. The wireless communication network 104 may include additional components or may not include all of the listed components based on, for example, the communication technology for the wireless communication network 104.

The station tower 142 is a fixed transceiver station, and the station tower 142 and the BSC 140 may be referred to as transceiver equipment. The transceiver equipment provides wireless network coverage for a particular coverage area commonly referred to as a "cell." The transceiver equipment transmits communication signals to, and receives communication signals from, mobile stations within its cell via the station tower 142. The transceiver equipment normally performs such functions as modulation and possibly encoding and/or encryption of signals to be transmitted to the mobile station 102 in accordance with particular, usually predetermined, communication protocols and parameters, under control of its controller. The transceiver equipment similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks.

The wireless link shown in communication system 100 of FIG. 1 represents one or more different channels, typically different radio frequency (RF) channels, and associated protocols used between the wireless network 104 and the mobile station 102. An RF channel is a limited resource that must be conserved, typically due to limits in overall bandwidth and a limited battery power of the mobile station 102. A wireless network may include hundreds of cells, each served by a station tower 142 (i.e. or station sector), depending upon desired overall expanse of network coverage. All pertinent components may be connected by multiple switches and routers (not shown), controlled by multiple network controllers.

For a plurality of mobile stations 102 registered with a network operator, permanent data (such as mobile station 102 user's profile) as well as temporary data (such as mobile station's 102 current location) are stored in the HLR 146. In case of a voice call to the mobile station 102, the HLR 146 is queried to determine the current location of mobile station 102. A Visitor Location Register (VLR) of the MSC 144 is responsible for a group of location areas and stores the data of those mobile stations that are currently in its area of responsibility. This includes parts of the permanent mobile station data that have been transmitted from the HLR 146 to the VLR for faster access. However, the VLR of the MSC 144 may also assign and store local data, such as temporary identifications. Optionally, the VLR of the MSC 144 can be enhanced for more efficient coordination of GPRS and non-GPRS services and functionality (e.g. paging for circuit-switched calls that can be performed more efficiently via the SGSN 148, and combined GPRS and non-GPRS location updates). The VLR of the MSC 144 of the example wireless communication network 104 is communicatively coupled to the VLR of the MSC 144 of the example communication network 105 to enable communication between the wireless communication network 104 and the wireless communication network 105 (e.g., via LOCATION AREA UPDATE messages).

The SGSN 148 is at the same hierarchical level as the MSC 144 and keeps track of the individual locations of mobile stations. The SGSN 148 also performs security functions and access control. The SGSN 148 of the example wireless communication network 104 and the SGSN 148 of the example wireless communication network 105 are communicatively coupled to allow communication between wireless communication network 104 and wireless communication network 105 (e.g., for communication of ROUTING AREA UPDATE messages and ATTACH messages). The GGSN 150 provides interworking with external packet-switched networks and is connected with SGSNs (such as SGSN 148) via an IP-based GPRS backbone network. The SGSN 148 performs authentication and cipher setting procedures based on the same algorithms, keys, and criteria as in existing GSM.

In conventional operation, cell selection may be performed autonomously by the mobile station 102 or by the transceiver equipment instructing the mobile station 102 to select a particular cell. The mobile station 102 informs wireless network 104 when it reselects another cell or group of cells, known as a routing area or tracking area. In some cases, when not in the home network, the mobile station 102 periodically scans for available wireless networks that may be of higher priority or that may be (E)HPLMNs.

In operation, the mobile station 102 makes its presence known to wireless network 104 by performing what is known as a GPRS "attach" operation. This operation establishes a logical link between the mobile station 102 and the SGSN 148 and makes the mobile station 102 available to receive, for example, pages via the SGSN 148, notifications of incoming data, or SMS messages. In order to send and receive data, the mobile station 102 assists in activating the packet data address that it wants to use. This operation makes mobile station 102 known to the GGSN 150; interworking with external data networks can thereafter commence. User data may be transferred transparently between the mobile station 102 and the external data networks using, for example, encapsulation and tunneling. Data packets are equipped with GPRS-specific protocol information and transferred between the mobile station 102 and the GGSN 150.

A wireless network may be connected to other systems, possibly including other networks, not explicitly shown in FIG. 1. A network will normally be transmitting at least some sort of paging and system information on an ongoing basis, even if there is no actual packet data exchanged. Although the network consists of many parts, these parts all work together to result in certain behaviors at the wireless link.

A mobile station typically offers a manual network selection for the end user as well as an automatic network selection procedure. The current 3GPP standard specifies that, for roaming, a mobile station shall select the highest priority network available (e.g., the highest priority VPLMN) as defined in one or more PLMN lists storing a listing of VPLMNS. The PLMN list or lists may be stored in the SIM 136. For example, see section 4.4.3.1.1 of the 3GPP standard (3GPP TS 23.122).

According to the example system 100 of FIG. 1, the wireless communication network 104 may be the HPLMN or an (E)HPLMN and the wireless communication network 105 may be representative of a plurality of VPLMNs. When the HPLMN or an (E)HPLMN is not available, the mobile station 102 scans for available networks and will select the highest priority VPLMN found in the scan. The mobile station 102 will perform a GPRS "attach" (Section 4.7.3, 3GPP TS 24.008) to attempt to register with the highest priority VPLMN according to a previously stored prioritized list of networks stored in the SIM 136 or the memory 120. Alternatively, the mobile station 102 may send a location update request (Section 4.4.1, 3GPP TS 24.008) when the location of the mobile station 102 has changed (e.g., the mobile station 102 moves from a first VPLMN to a second VPLMN). Based on user data communicated to the selected VPLMN, the VPLMN will query the HPLMN associated with the mobile station 102. For example, the SGSN 148 of the VPLMN will communicate with the SGSN 148 of the HPLMN to confirm the registration request from the mobile station 102.

Once registered on a VPLMN, this network becomes the Registered Public Land Mobile Network or RPLMN. If the RPLMN is not the highest priority VPLMN according to the previously stored prioritized list of networks, then the mobile station is required to periodically scan to determine if it has moved into coverage of a higher priority VPLMN. The periodicity of this higher priority PLMN search is defined in a file stored in the SIM (see Section 4.2.6 of 3GPP TS 31.102). The Higher Priority PLMN Search Period describes the interval of time between searches for a higher priority PLMN, and the minimum value of this timer is 6 minutes (defined in 3GPP TS 22.011). In addition to this specification requirement, occasionally home network operators have an additional requirement that if the mobile station is in certain countries that border the home country (identified by their MCC), then the mobile station is required to search for their HPLMN or an (E)HPLMN at the search interval described in the Higher Priority PLMN Search Period even when the mobile station is registered to the highest priority VPLMN. Not all subsequent scans will result in identification of higher priority VPLMNs or (E)HPLMNs. Accordingly, as explained below the search manager 122 controls searching so that the mobile station 102 may refrain from searching when it is probable that the result of the search will not result in a higher priority VPLMN or an (E)HPLMN. Additionally, more frequency bands have become available and more radio technologies are incorporated into mobile devices and deployed in live networks. As such, the complexity of mobile stations is increasing. One consequence of this is that it takes longer to search for preferred networks while in a visited network due to the potentially large number of combinations of access technology/frequency bands supported by the UE and also deployed in the VPLMN. For this additional reason, eliminating PLMN scans that are unlikely to identify higher priority networks is advantageous.

Flowcharts representative of example processes that may be executed to implement some or all of the elements of the system 100 and mobile communication devices described herein are shown in FIGS. 2-8.

In these examples, the process represented by each flowchart may be implemented by one or more programs comprising machine readable instructions for execution by: (a) a processor, such as a microprocessor; (b) a controller, such as the controller 106 of FIG. 1; and/or (c) any other suitable device. The one or more programs may be embodied in software stored on a tangible medium such as, for example, a flash memory, a CD-ROM, a floppy disk, a hard drive, a DVD, or a memory associated with the controller 106, but the entire program or programs and/or portions thereof could alternatively be executed by a device other than the controller 106 and/or embodied in firmware or dedicated hardware (e.g., implemented by an application specific integrated circuit (ASIC), a programmable logic device (PLD), a field programmable logic device (FPLD), discrete logic, etc.). For example, any one, some or all of the example mobile communications system components could be implemented by any form of logic or any combination of software, hardware, and/or firmware. Also, some or all of the processes represented by the flowcharts of FIGS. 2-4 may be implemented manually.

Further, although the example processes are described with reference to the flowcharts illustrated in FIGS. 2-8, many other techniques for implementing the example methods and apparatus described herein may alternatively be used. For example, with reference to the flowcharts illustrated in FIGS. 2-8, the order of execution of the blocks may be changed, and/or some of the blocks described may be changed, eliminated, combined, and/or subdivided into multiple blocks.

Figure 2:
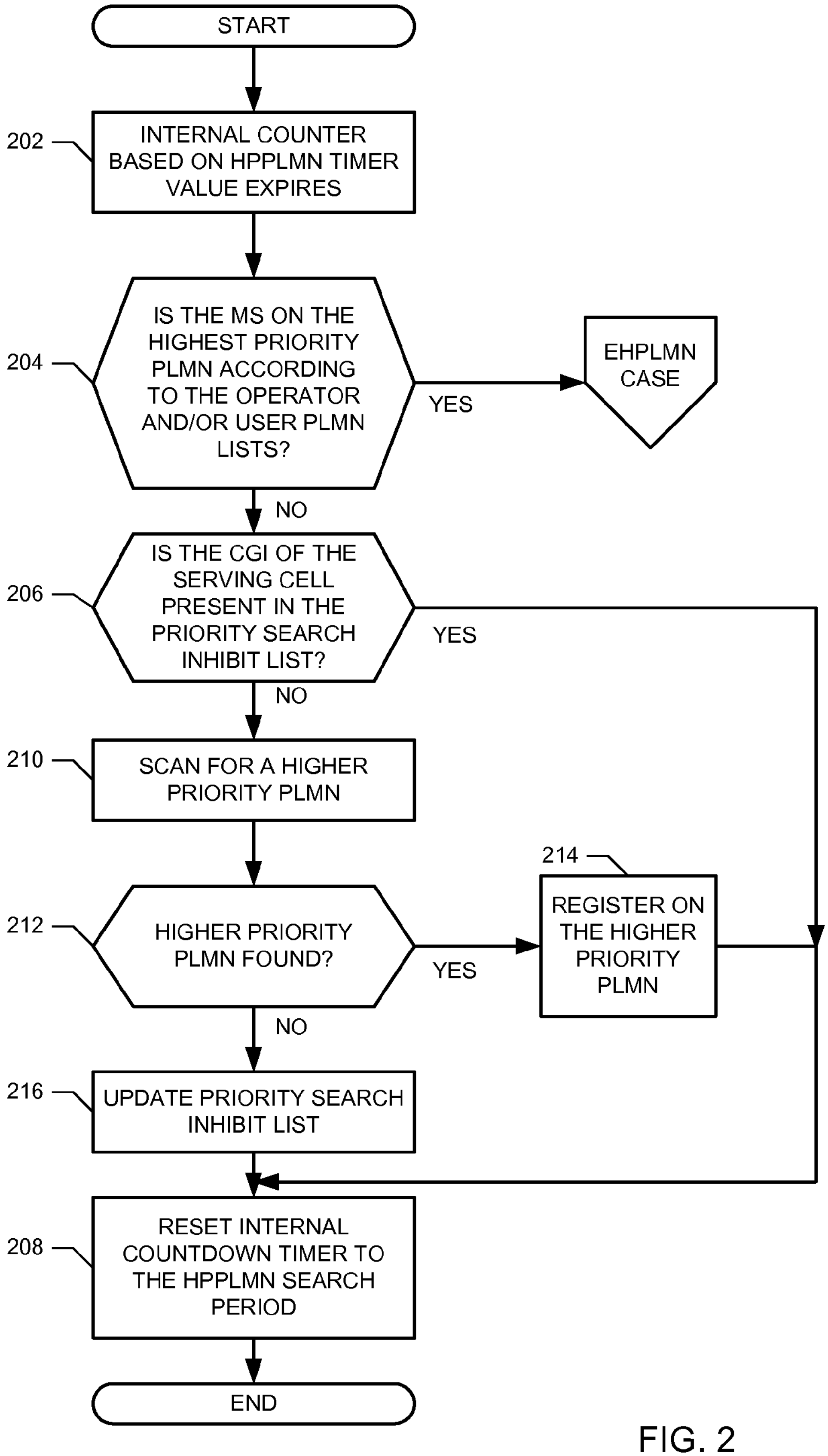
FIG. 2 is a flowchart of an example process that may be implemented by a mobile device such as the mobile station of FIG. 1 to utilize and update a priority search inhibit list.

FIG. 2 is a flowchart of an example process that may be implemented by a mobile device such as the mobile station 102 to control scanning by the mobile device 102 to detect available networks. As explained herein, the mobile station 102 maintains a priority search inhibit list 124A, which may be a part of the search inhibit list 124 of FIG. 1, to track network resources that are not available in particular geographic areas.

Figure 3:
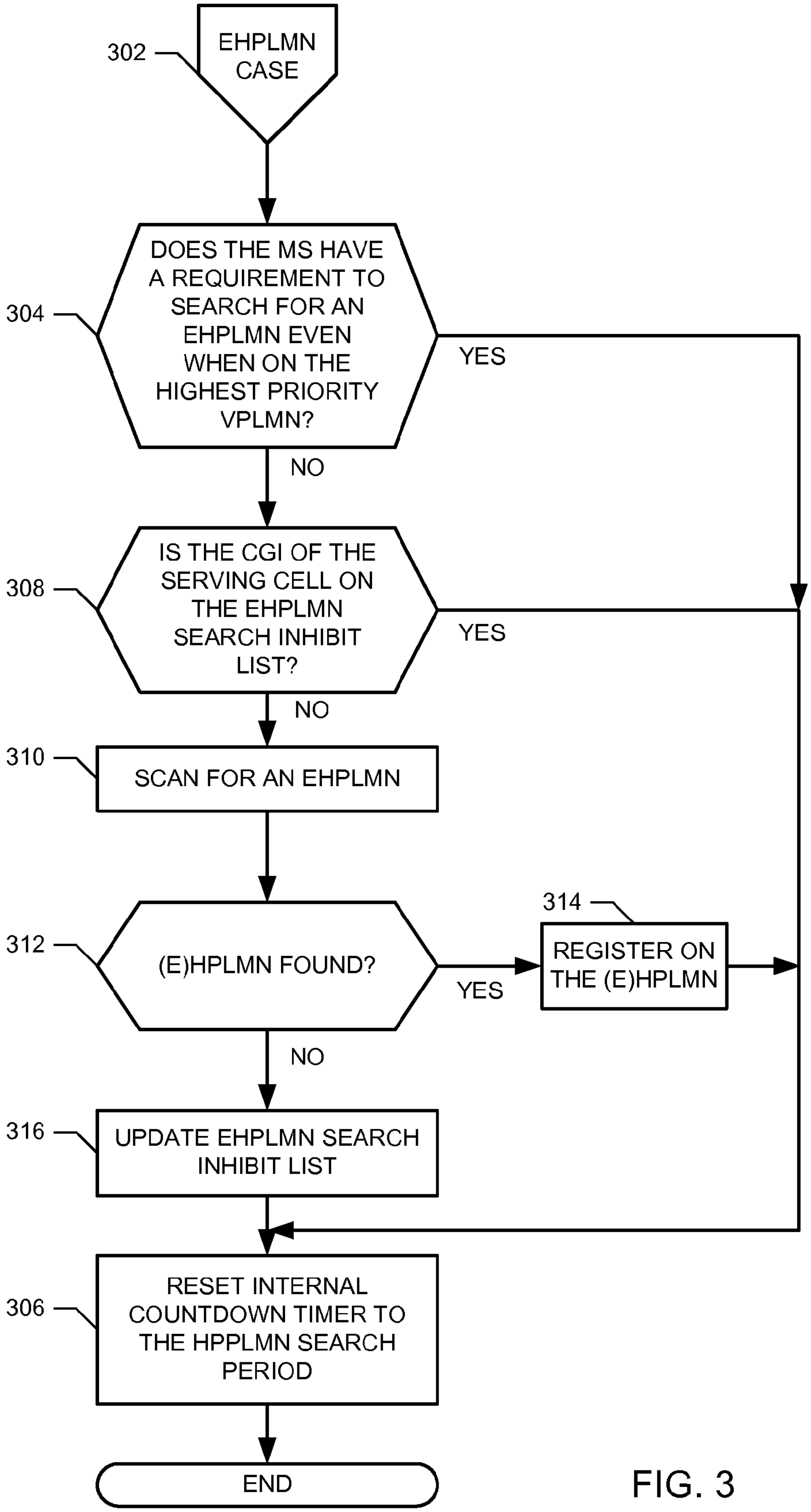
FIG. 3 is a flowchart of an example process that may be implemented by a mobile device such as the mobile station of FIG. 1 to utilize and update an equivalent home public land mobile network ((E)HPLMN) search inhibit list.

In one example, the process of FIG. 2 is carried out by the search manager 122 of the mobile station 102 of FIG. 1. The process of FIG. 2 may begin when an internal countdown timer based on a higher priority PLMN (HPPLMN) search period expires (block 202). Alternatively, the process of FIG. 2 may begin under other circumstances. The mobile station 102 determines whether it is connected to the highest priority PLMN according to the operator controlled or the user controlled PLMN lists ($EF_{OPLMNwACT}$ or $EF_{PLMNwACT}$ as defined in 3 GPP TS 31.102), or both (block 204). If the mobile station 102 is on the highest priority PLMN, the process described below in conjunction with FIG. 3 is carried out.

Alternatively, if the mobile station 102 is not connected to the highest priority PLMN (block 204), the mobile station 102 determines if the cell global identity (CGI) of the serving cell of the mobile station 102 (3GPP TS 23.122 defines the serving cell as the cell on which the MS is camped) is listed in the priority search inhibit list 124A (block 206). The CGI is the location area identification (i.e., a concatenation of mobile country code (MCC), the mobile network code (MNC), and the location area code (LAC)) concatenated with the cell identity (CI).

The presence of the CGI in the priority search inhibit list 124A (block 206) is an indication that no higher priority networks are available for the mobile station 102 because the mobile station 102, at some prior time, scanned for, and was not successful in finding, any higher priority networks. Accordingly, when the CGI is present in the priority search inhibit list 124A (block 206) the mobile station 102 does not perform a scan, resets the internal countdown timer to the HPPLMN search period (block 208) and the process ends. This logic creates a situation in which periodic PLMN scans shall only be performed by the mobile station 102 if the CGI of the serving cell is not in the priority search inhibit list 124A on the mobile station 102. Thus, through the use of the priority search inhibit list 124A, scanning that is not likely to result in locating higher priority networks is avoided. Avoiding periodic PLMN scans usually carried out according to a search period while roaming can increase the efficiency of the mobile station 102. Increased efficiency can result in additional battery life in some scenarios, for example when the mobile is stationary or mobile only with a small geographic area for a long time (which is a common scenario for many travellers).

If the CGI of the serving cell is not in the priority search inhibit list 124A (block 206), the mobile station 102 scans for higher priority PLMNs (block 210). When a higher priority PLMN is found (block 212), the mobile station 102 registers on the higher priority PLMN (block 214) and the mobile station resets the internal countdown timer to the HPPLMN search period (block 208) and the process ends.

If a higher priority PLMN is not found (block 212), the mobile station updates a priority search inhibit list 124A, which may be a part of the search inhibit list 124 of FIG. 1, by adding the CGI of the serving cell thereto (block 216). In one example, the mobile station 102 shall store the CGI of the serving cell where the scan for the higher priority PLMN was not successful, in addition to a validity timer for that serving cell indicating how long to refrain from searching for higher priority PLMNs when on that serving cell. In another example, the mobile station 102 shall store the CGI of the serving cell where the scan for the higher priority PLMN was not successful, in addition to the PLMN identities of all PLMNs found in the periodic search attempt to access a higher priority PLMN, in the priority search inhibit list 124A on the mobile station 102. As explained below in conjunction with Tables 1-6, the priority search inhibit list 124A may take different forms, such as a simple priority search inhibit list, a modified simple priority search inhibit list, and a full priority search inhibit list. Other priority search inhibit lists are possible. The priority search inhibit list 124A may be updated with different information depending upon the form of the priority search inhibit list 124A. In one example, the mobile station 102 updates the priority search inhibit list 124A at the first instance of not finding a desired PLMN (e.g., a higher priority PLMN or a home or equivalent home PLMN). In another example, the mobile station 102 may update the priority search inhibit list 124A after a number of PLMN scans from the same serving cell did not find a desired PLMN. This may be implemented using a counter that may be configured by the network and managed by the mobile station 102 or the network to count the number of consecutive times that the mobile station 102 is unable to find a higher priority network while camped on a given serving cell. Such a counter may be reset when leaving the serving cell. Additionally, in some examples, the mobile station 102 may be configured not to add the CGIs of certain serving cells to the priority search inhibit list 124A.

For example, to indicate that a higher priority PLMN has not been found, the CGI of the serving cell may added to a simple priority search inhibit list. If a modified simple priority search inhibit list is utilized, that list may be updated with the CGI of the serving cell and a time (e.g., the time of a validity timer). If a full priority search inhibit list is utilized, a record may be created for each CGI which contains a PLMNwACT Count field (described below), and an entry with details for each PLMN found during the scan. Other representations of information related to the scan, the location of the scan (e.g., other expressions of the scan location or information similar to the CGI or a subset of the information making up a CGI or any other similar identifier for any radio access technology), the time of the scan, and the results of the scan may be added to any of the priority search inhibit lists. That is, while the search inhibit lists are described herein as having particular information formatted in a particular manner, other information or formats of the information are possible.

After the priority search inhibit list 124A is updated (block 216), the mobile station 102 resets the internal countdown timer to the HPPLMN search period (block 208) and the process of FIG. 2 ends.

FIG. 3 is a flowchart of an example process that may be implemented by a mobile device such as the mobile station 102 to control scanning by the mobile device 102 to detect available (E)HPLMN networks when in a visited or roaming network and when already on the highest priority PLMN (according to the $EF_{PLMNwACT}$ and/or $EF_{OPLMNwACT}$ lists as described above) available from the serving cell. As explained below, the mobile station 102 maintains an (E)HPLMN search inhibit list 124B, which may be a part of the search inhibit list 124 of FIG. 1, to track network resources that are not available in particular geographic areas.

In one example, the process of FIG. 3 is carried out by the search manager 122 of the mobile station 102 of FIG. 1. The process of FIG. 3 may begin when the mobile station 102 determines that it is connected to the highest priority PLMN when in a visited or roaming network (block 204 of FIG. 2) (block 302). In other examples, the process of FIG. 3 may begin when the mobile station 102 determines to search for a higher priority (E)HPLMN.

The process of FIG. 3 determines if the mobile station 102 has a requirement to search for an (E)HPLMN even if the mobile station 102 is connected to the highest priority VPLMN (block 304). If there is no requirement to search for an (E)HPLMN when connected to the highest priority VPLMN (block 304), the mobile station 102 resets the internal countdown timer to the HPPLMN search period (block 306) and the process ends. Alternatively, if the mobile station 102 is required to search for an (E)HPLMN (block 304), the mobile station determines if the CGI of the serving cell is on the (E)HPLMN search inhibit list 124B (block 308). In a further alternative where the requirement to search for an (E)HPLMN while on the highest priority VPLMN exists, the (E)HPLMN search inhibit list could be combined with or included in other search inhibit lists as previously described, in which case the mobile station 102 would check the (modified) simple/full priority search inhibit list as in the case where it is not on the highest priority VPLMN to see if the CGI of the serving cell has been added to that list indicating a previous unsuccessful search.

If the CGI of the serving cell is in the (E)HPLMN search inhibit list 124B (block 308), the mobile station 102 resets the internal countdown timer to the HPPLMN search period (block 306) and the process ends. This logic creates a situation in which periodic attempts to find an (E)HPLMN shall only be performed by the mobile station 102 if the CGI of the serving cell is not in the search inhibit list 124 on the mobile station 102. Alternatively, if the CGI of the serving cell is not on the (E)HPLMN search inhibit list 124B (block 308), the mobile station 102 scans for an (E)HPLMN (block 310). If an (E)HPLMN is found (block 312), the mobile station 102 registers on the (E)HPLMN (block 314) and may reset or otherwise manage the internal countdown timer to the HPPLMN search period (block 306) and the process ends. Alternatively, when an (E)HPLMN is not found (block 312), the mobile station updates the (E)HPLMN search inhibit list 124B (block 316), resets the internal countdown timer to the HPPLMN search period (block 306) and the process ends. Updating the (E)HPLMN search inhibit list 124B may include the mobile station 102 storing the CGI of the serving cell in addition to the PLMN identities of all PLMNs found in the periodic attempt to access the HPLMN or an (E)HPLMN. The mobile station 102 shall remain on the VPLMN. The (E)HPLMN search inhibit list 124B may be maintained in a similar manner and format as described below in conjunction with Tables 1-6. The (E)HPLMN search inhibit list 124B may take different forms, such as a simple (E)HPLMN search inhibit list, a modified simple (E)HPLMN search inhibit list, and a full (E)HPLMN search inhibit list. Other (E)HPLMN search inhibit lists are possible. The (E)HPLMN search inhibit list 124B may be updated with different information depending upon the form of the (E)HPLMN search inhibit list 124B. Additionally, in some examples, the mobile station 102 may be configured not to add certain CGIs to the (E)HPLMN search inhibit list 124B.

For example, to indicate that an (E)HPLMN has not been found during a scan from the serving cell, the CGI of the serving cell may be added to a simple (E)HPLMN search inhibit list. If a modified simple (E)HPLMN search inhibit list is utilized, that list may be updated with the CGI of the serving cell and a time (e.g., the time of a validity timer). If a full (E)HPLMN search inhibit list is utilized, the full (E)HPLMN search inhibit list may be updated with CGI of the serving cell, the PLMNwACT Count (described below), and an entry for each PLMN found during the scan may also be added to the CGI record. Other information related to the scan, the location of the scan, the time of the scan, and the results of the scan may be added to any of the (E)HPLMN search inhibit list 124B.

When updates are made to the Operator or User Controlled PLMN lists on the SIM ($EF_{OPLMNwACT}$ and/or $EF_{PLMNwACT}$), the search inhibit list 124 may be updated. In the case of the simple search inhibit list in which only the CGI of the serving cells where a higher priority PLMN or (E)HPLMN has not been found have been stored, the mobile station 102 shall delete the simple search inhibit list when the Operator and/or User Controlled PLMN lists are updated. In the case of the modified simple search inhibit list in which the CGI of the serving cells where a higher priority PLMN has not been found have been stored along with a validity timer for each CGI, the mobile station 102 shall delete the modified simple search inhibit list when the Operator and/or User Controlled PLMN lists are updated.

Figure 4:
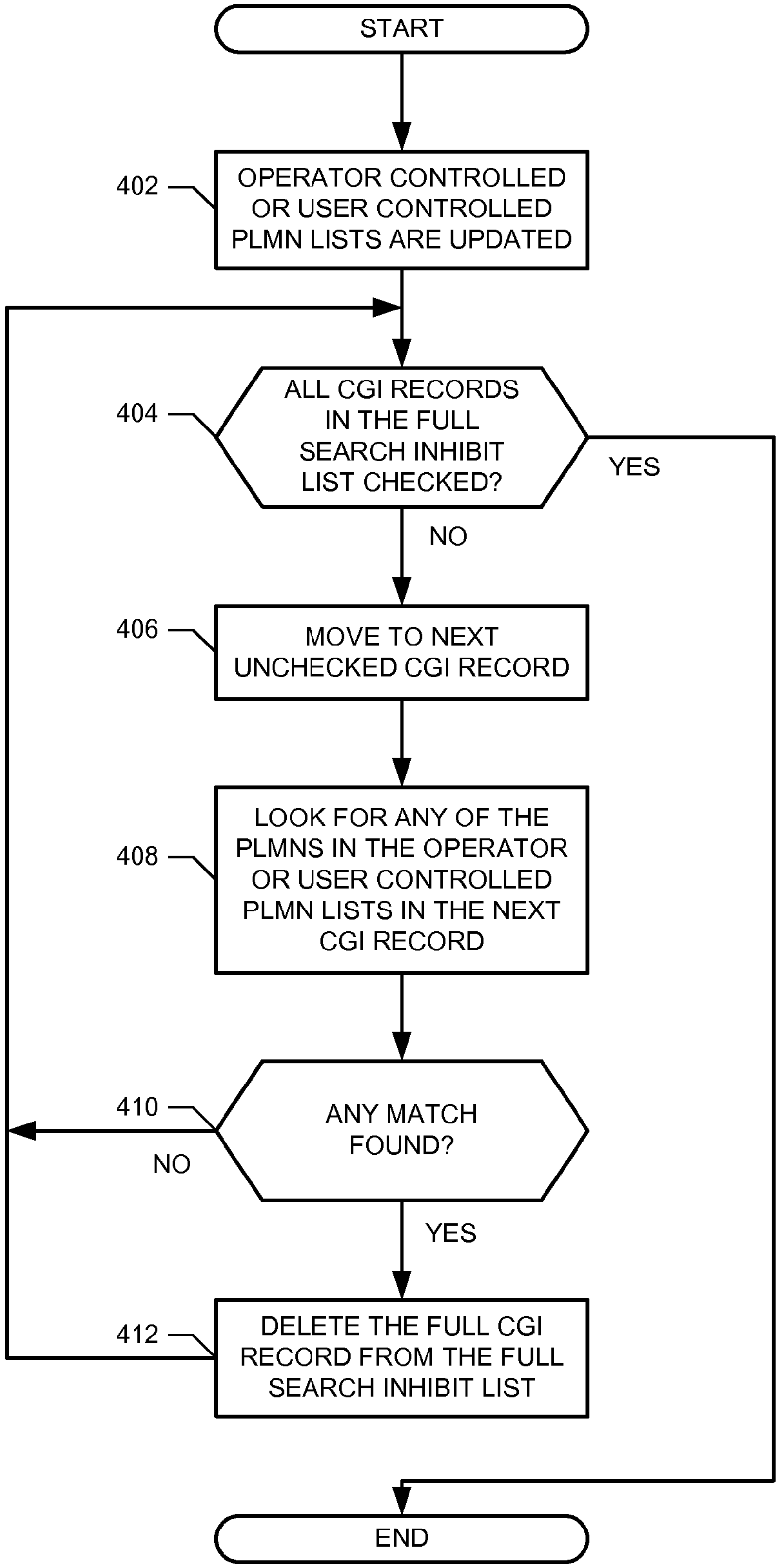
FIG. 4 is a flowchart of an example process that may be implemented by a mobile device such as the mobile device of FIG. 1 to maintain search inhibit lists during PLMN list updates.

As shown in FIG. 4, when a full search inhibit list is utilized, wherein for each CGI where a higher priority PLMN has not been found the CGI and all the PLMNs and access technologies that were found have been stored, when the Operator and/or User Controlled PLMN list is updated (block 402), the mobile station determines if all CGI records in the full search inhibit list have been checked (block 404). If all of the CGI records have been checked, the process of FIG. 4 ends. If all of the CGI records have not been checked (block 404), the mobile station 102 selects the next unchecked CGI record (block 406) and looks for any of the PLMNs in the Operator and/or User Controller PLMN list in the selected CGI record (block 408). If no match is found (block 410), the process of FIG. 4 returns to block 404. Alternatively, if a match is found (block 410), the mobile station 102 deletes the full CGI record from the full search inhibit list (block 412). Additionally, in some examples, the mobile station 102 may be configured not to remove certain CGIs from the search inhibit list 124.

As explained above, a search inhibit list 124 may take the form of a priority search inhibit list 124A or an (E)HPLMN search inhibit list 124B. The search inhibit list 124 may be referred to as simple, modified simple, and full, each of which is described below in conjunction with search inhibit list 124 that may be used for priority or (E)HPLMN search inhibiting. In one example, the search inhibit 124 list may be a simple search inhibit list as shown below, wherein the CGI of the serving cell is added to the list each time that a scan is undertaken at a serving cell and no higher priority PLMN or (E)HPLMN is found.

TABLE 1

| Simple Search Inhibit List | | | |
|---|---|---|---|
| Identifier: '6FXX' File size: 7n | Structure: transparent | Update activity: high | Optional |
| Access Conditions: | | | |
| READ | PIN | | |
| UPDATE | PIN | | |
| DEACTIVATE | ADM | | |
| ACTIVATE | ADM | | |
| **Bytes** | **Description** | **M/O** | **Length** |
| 1 to 7 | CGI of Serving Cell# 1 | M | 7 bytes |
| 8 to 14 | CGI of Serving Cell# 2 | O | 7 bytes |
| . | | | |
| . | | | |
| . | | | |
| (7n − 6) to 7n | CGI of Serving Cell# n | O | 7 bytes |

The CGI of the serving cell is noted as Mobile Country Code (MCC) followed by the Mobile Network Code (MNC) followed by the LAC (Location Area Code) followed by the Cell Identity (as per 3GPP TS 24.008). This information is coded in accordance with TS 24.008.

In another example, the search inhibit list 124 may be a modified simple search inhibit list, as shown in Table 2.

TABLE 2

| Modified Simple Search Inhibit List | | | |
|---|---|---|---|
| Identifier: '6FXX' File size: 8n | Structure: transparent | Update activity: high | Optional |
| Access Conditions: | | | |
| READ | PIN | | |
| UPDATE | PIN | | |
| DEACTIVATE | ADM | | |
| ACTIVATE | ADM | | |
| **Bytes** | **Description** | **M/O** | **Length** |
| 1 to 7 | CGI of Serving Cell# 1 | M | 7 bytes |
| 8 | Validity Timer Cell# 1 | M | 1 byte |
| 9 to 15 | CGI of Serving Cell# 2 | O | 7 bytes |
| 16 | Validity Timer Cell# 2 | O | 1 byte |
| . | | | |
| . | | | |
| . | | | |
| (8n − 7) to (8n − 1) | CGI of Serving Cell# n | O | 7 bytes |
| 8n | Validity Timer Cell# n | O | 1 byte |

The entries in the modified simple search inhibit list can have an expiry time. Thus, a CGI on this list is only valid for a fixed period of time (e.g., a number of minutes or hours), after which time that CGI should be removed from the list. In this case, each entry in this list includes a timestamp. In one example, the timestamp could be realized by storing a counter value for each entry which represents the number of hours (or minutes) remaining that each entry is valid. The mobile station 102 checks the modified simple search inhibit list every hour (or minute) and decrements the counter values for each of the CGI in the list. Any counter values that are at zero (or alternatively that are decremented to zero) would be result in the CGI and the associated counter value being removed from the modified simple search inhibit list.

Referring to Table 2, the CGI field contains Mobile Country Code (MCC) followed by the Mobile Network Code (MNC) followed by the LAC (Location Area Code) followed by the Cell Identity (as per 3GPP TS 24.008). The Validity Timer field contains a value representing the amount of time remaining before this CGI is removed from the modified simple search inhibit list. In one example, one byte is used to represent the number of hours that the CGI in the list is valid. This value is decremented by the mobile station 102 every hour, and when the field reaches zero the CGI and its Validity Timer are removed from the list. If the modified simple search inhibit list is used, then each time a cell is searched and no higher priority PLMN is found, the CGI of that cell is added to this list, as is a validity time indication.

In another example, the search inhibit list 124 may be a full search inhibit list, as shown in Table 3. This list is similarly managed when a higher priority search is conducted. The order of the PLMNs given in the list does not represent any correlation to the prioritization of PLMNs according to the Operator or User Controlled PLMN lists. For each serving cell where the PLMNs search is conducted and a higher priority PLMN (or an (E)HPLMN when on the highest priority PLMN and where required) is not found, the CGI of the serving cell is stored along with each PLMN that was found during the PLMN search conducted from the serving cell, and a counter value which indicates the number of PLMNs that are stored in this record. This list also contains the access technology indicator for each of the PLMNs in the list. This record is repeated for each CGI of a serving cell where a higher priority search by the mobile station 102 has not been successful, as shown in Table 3.

TABLE 3

| Full Search Inhibit List | | | |
|---|---|---|---|
| Identifier: '6FXX' Record length: n + 8 bytes | Structure: Linear fixed | Update activity: high | Optional |
| Access Conditions: | | | |
| READ | PIN | | |
| UPDATE | PIN | | |
| DEACTIVATE | ADM | | |
| ACTIVATE | ADM | | |
| **Bytes** | **Description** | **M/O** | **Length** |
| 1 to 7 | CGI of Serving cell | M | 7 bytes |
| 8 | PLMNwACT count | M | 1 byte |
| 8 to 10 | $1^{st}$ PLMN | O | 3 bytes |
| 11 to 12 | $1^{st}$ PLMN Access Technology Identifier | O | 2 bytes |
| 13 to 15 | $2^{nd}$ PLMN | O | 3 bytes |
| 16 to 17 | $2^{nd}$ PLMN Access Technology Identifier | O | 2 bytes |
| . | | | |
| . | | | |
| . | | | |
| (5n + 3) to (5n + 5) | $N^{th}$ PLMN | O | 3 bytes |
| (5n + 6) to (5n + 7) | $N^{th}$ PLMN Access Technology Identifier | O | 2 bytes |

In Table 3, the CGI of the serving cell field contains Mobile Country Code (MCC) followed by the Mobile Network Code (MNC) followed by the LAC (Location Area Code) followed by the Cell Identity (as per 3GPP TS 24.008). This field is the current serving cell where the PLMNs given in the remainder of the record were detected. Coding is carried out according to TS 24.008. The field PLMNwACT count represents the number of PLMNs that are stored for this CGI. This information is coded by using one byte to represent the number of PLMNs that are stored for this CGI. The PLMN fields contain Mobile Country Code (MCC) followed by the Mobile Network Code (MNC). This information is coded according to TS 24.008. The Access Technology Identifier field is coded as follows: 2 bytes are used to select the access technology according to the mapping outlined below in Tables 4 and 5.

According to the full search inhibit list, bytes **12*n*-1 and 12*n*** are represented as shown in Tables 4 and 5, respectively.

TABLE 4

Byte 12n-1 Coding

| b8 | b7 | b6 | b5 | b4 | b3 | b2 | b1 |
|---|---|---|---|---|---|---|---|
| UTRAN | E-UTRAN | RFU | RFU | RFU | RFU | RFU | RFU |

TABLE 5

Byte 12n Coding

| b8 | b7 | b6 | b5 | b4 | b3 | b2 | b1 |
|---|---|---|---|---|---|---|---|
| GSM | GSM COMPACT | cdma2000 HRPD | cdma2000 1xRTT | RFU | RFU | RFU | RFU |

In one example, the Cell Identity (2 bytes) is added to the LAI to form the CGI; however the first byte of the LAI (the LAI IEI) is not included. The full LAI format is 6 bytes, removing the LAI IEI leaves 5 bytes and adding the Cell Identity adds 2 bytes, and thus 7 bytes are needed. Table 6 shows one example implementation of the full LAI information element.

TABLE 6

LAI Information Element

| 8 7 6 5 | 4 3 2 1 | |
|---|---|---|
| Location Area Identification IEI | | octet 1 |
| MCC digit 2 | MCC digit 1 | octet 2 |
| MNC digit 3 | MCC digit 3 | octet 3 |
| MNC digit 2 | MNC digit 1 | octet 4 |
| LAC | | octet 5 |
| LAC (continued) | | octet 6 |

Figure 5:
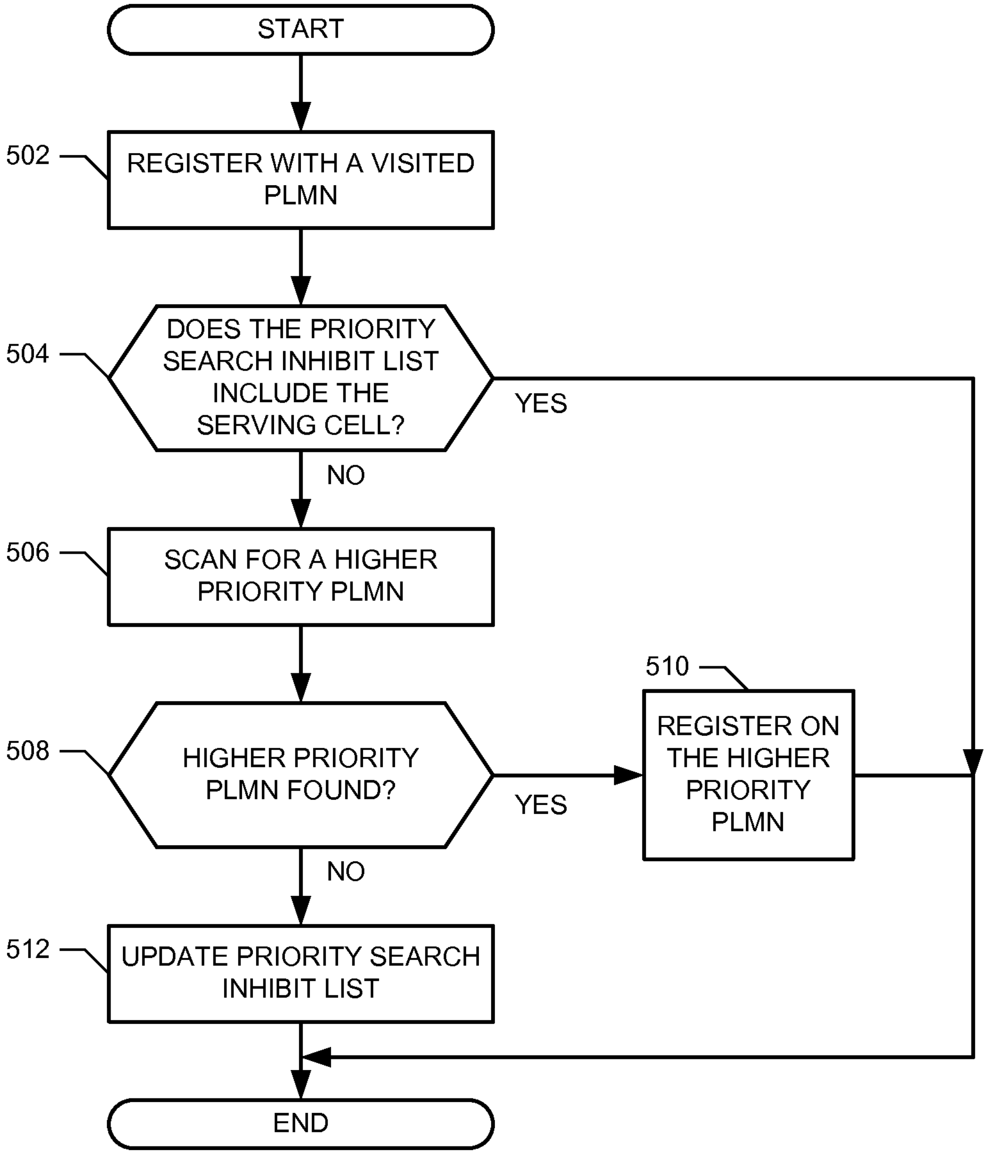
FIG. 5 is a flowchart of a second example process that may be implemented by a mobile device such as the mobile station of FIG. 1 to utilize and update a priority search inhibit list.

While the processes of FIGS. 2 and 3 are described above as being interrelated, wherein the process of FIG. 2 may start the process of FIG. 3, this is merely one example. As shown in FIG. 5, a second example process that may be implemented by a mobile device such as the mobile station 102 of FIG. 1 to utilize and update a priority search inhibit list begins when the mobile station 102 registers with a VPLMN (block 502). The registration may include the mobile station 102 camping on a serving cell identified by a CGI. The mobile station 102 may remain registered to the VPLMN and perform a cell reselection to camp on a different serving cell than the serving cell from which the mobile station 102 originally accessed the VPLMN.

The mobile station 102 determines if the priority search inhibit list 124 of the mobile station 102 includes an identification of the serving cell (block 504). If the priority search inhibit list 124 includes an indication of the serving cell (block 504), the process of FIG. 5 ends. However, if the priority search inhibit list 124 does not include an indication of the serving cell (block 504), the mobile station 102 scans for a higher priority PLMN (block 506). If a higher priority PLMN is found (block 508), the mobile station 102 registers on the higher priority PLMN (block 510). If a higher priority PLMN is not found (block 508), the mobile station 102 updates the priority search inhibit list 124 to include an indication of the serving cell (block 512) and the process of FIG. 5 ends. In some examples, the mobile station 102 may be configured not to add certain serving cells to the priority search inhibit list 124.

Figure 6:
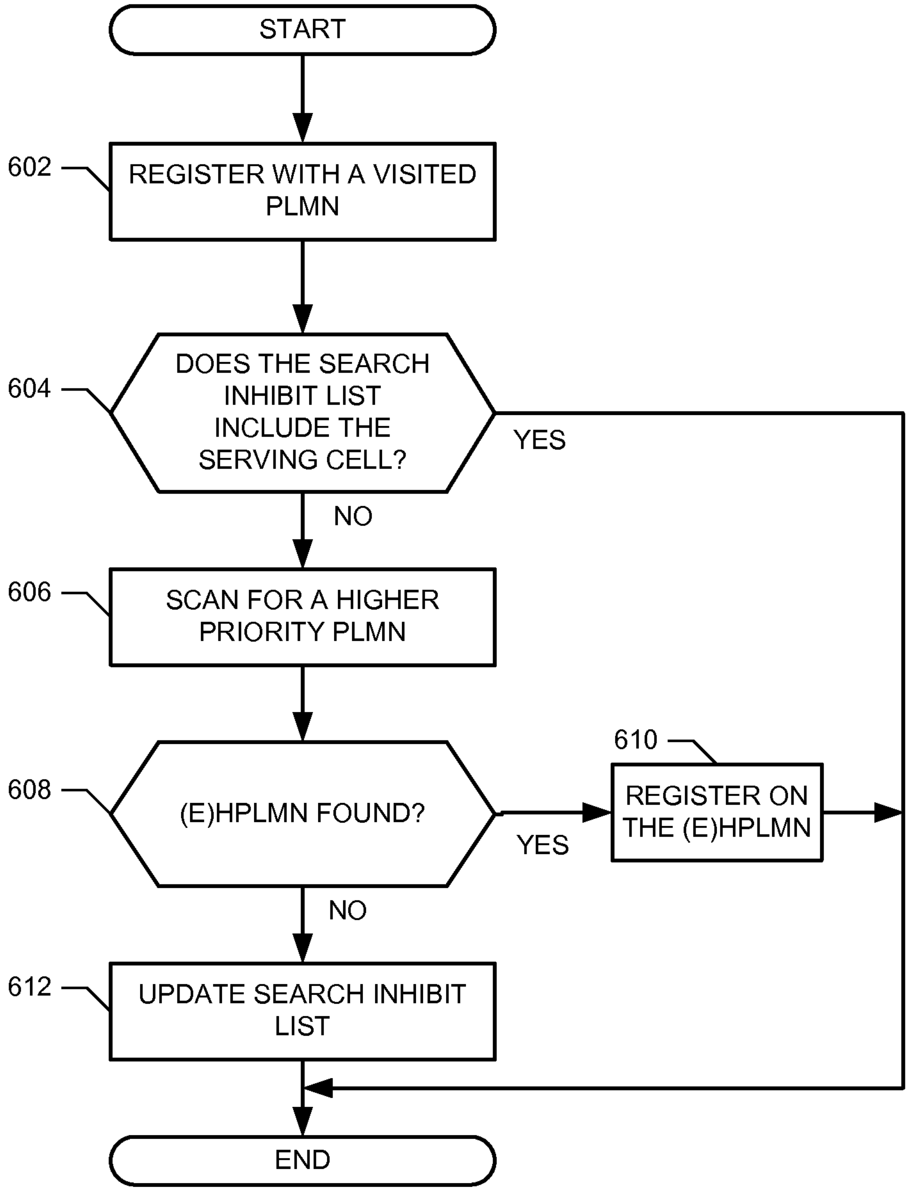
FIG. 6 is a flowchart of a second example process that may be implemented by a mobile device such as the mobile station of FIG. 1 to utilize and update an (E)HPLMN search inhibit list.
Figure 7:
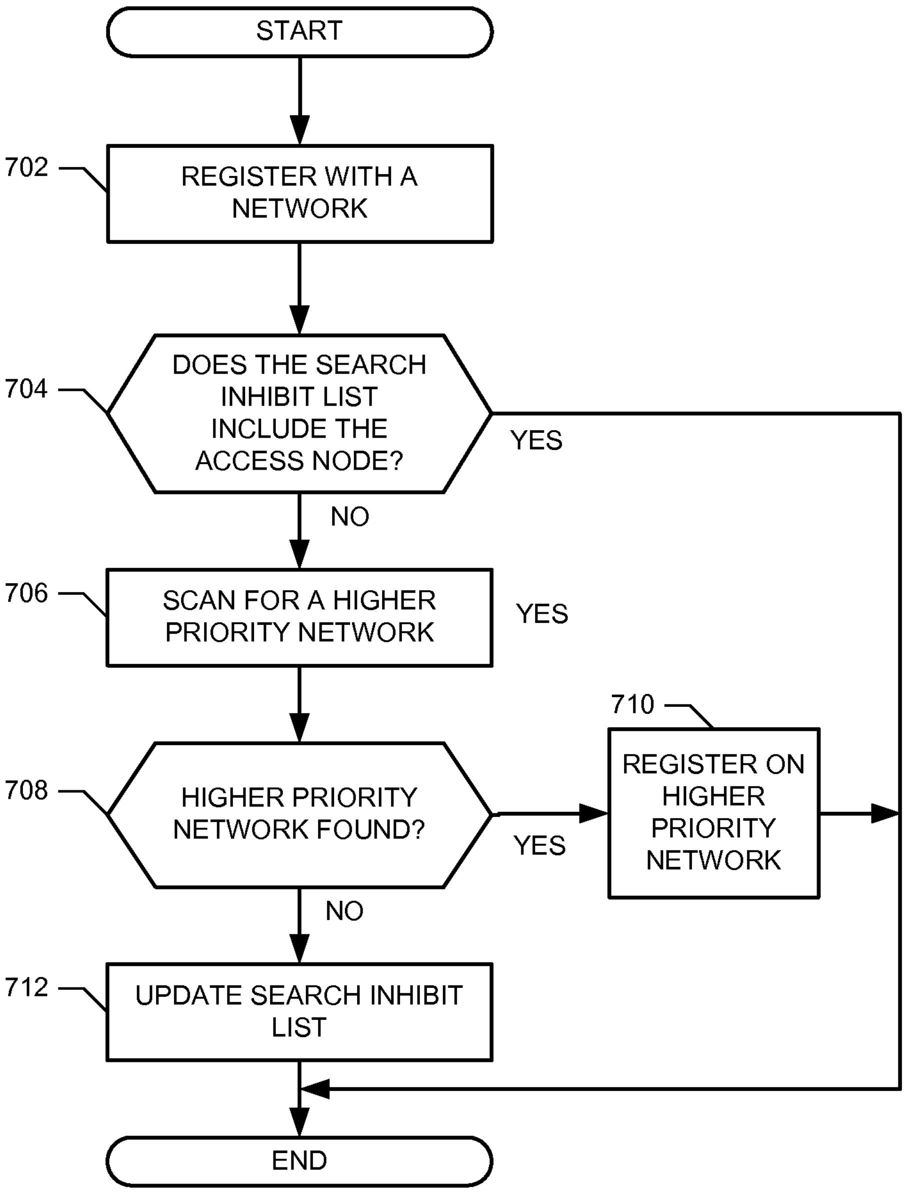
FIG. 7 is a flowchart of a third example process that may be implemented by a mobile device such as the mobile station of FIG. 1 to utilize and update a priority search inhibit list.

In another example, priority scans may be carried out and a search inhibit list may be updated to indicate that no (E)HPLMN has been found. For example, as shown in FIG. 6 the mobile station 102 registers with a VPLMN (block 602). The registration may include the mobile station 102 camping on a serving cell identified by a CGI. The mobile station 102 may remain registered to the VPLMN and perform a cell reselection to camp on a different serving cell than the serving cell from which the mobile station 102 originally accessed the VPLMN.

The mobile station 102 determines if the search inhibit list 124 of the mobile station 102 includes an identification of the serving cell (block 604). If the search inhibit list 124 includes an indication of the serving cell (block 604), the process of FIG. 6 ends. However, if the search inhibit list 124 does not include an indication of the serving cell (block 604), the mobile station 102 scans for a higher priority PLMN (block 606). If an (E)HPLMN is found in the scan (block 608), the mobile station 102 registers on the (E)HPLMN (block 610). If an (E)HPLMN is not found (block 608), the mobile station 102 updates the search inhibit list to include an indication of the serving cell (block 612), thereby indicating that an (E)HPLMN was not found, and the process of FIG. 6 ends. In some examples, the mobile station 102 may be configured not to add the CGI of certain serving cells to the search inhibit list. In one example, the search inhibit list may be updated and stored on the SIM 136. The search inhibit list may be stored in any suitable location in any suitable storage.

While the foregoing examples pertain to cellular networks and, in certain examples, 3GPP networks, the methods and apparatus described herein may be applied to any type of network and any type of access node (e.g., wireless local area networks (WLANs), any cellular network technology, pico networks, personal area networks (PANs), etc.). For example, referring to FIG. 7, a mobile station 102 registers with a network (block 702). The registration may include the mobile station 102 camping on an access node. The mobile station 102 may remain registered to the network and perform a reselection to camp on a different access node than the access node from which the mobile station 102 originally accessed the network.

The mobile station 102 determines if the search inhibit list 124 of the mobile station 102 includes an identification of the access node (block 704). If the search inhibit list 124 includes an indication of the access node (block 704), the process of FIG. 7 ends. However, if the search inhibit list 124 does not include an indication of the access node (block 704), the mobile station 102 scans for a higher priority network (block 706). If a higher priority network is found in the scan (block 708), the mobile station 102 registers on the higher priority network (block 710). If a higher priority network is not found (block 708), the mobile station 102 updates the search inhibit list to include an indication of the access node (block 712), thereby indicating that a higher priority network was not found, and the process of FIG. 7 ends. In some examples, the mobile station 102 may be configured not to add certain access nodes to the search inhibit list.

Figure 8:
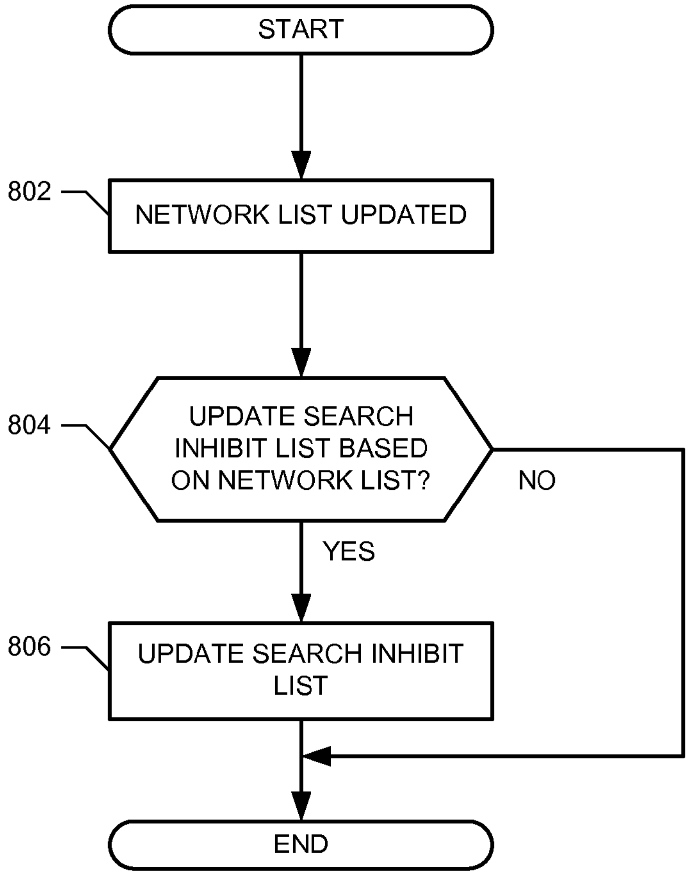
FIG. 8 is a flowchart of an example process that may be implemented by a mobile device such as the mobile device of FIG. 1 to maintain search inhibit lists during network list updates.

As shown in FIG. 8, one or more search inhibit lists 124 may be updated based on changes in network lists. For example, the mobile station 102 may determine that a network list has been updated (block 802). Based at least in part on the updated network list, the mobile station 102 determines if one or more search inhibit lists 124 should be updated (block 804). If no search inhibit lists 124 are to be updated (block 804), the process of FIG. 8 ends. Alternatively, if search inhibit lists 124 are to be updated (block 804), the update search inhibit lists 124 are updated by the mobile station 102 (block 806). In some examples, the mobile station 102 may be configured not to add or remove certain networks from the search inhibit list.

The systems, methods, apparatus, and articles of manufacture described herein have numerous benefits, such as, for example, reducing the frequency of PLMN scans without affecting device performance (cell search and (re)selection time). One example advantage is a more efficient scanning algorithm and increased battery life in roaming scenarios. The benefits of the solutions described herein are greatest were the user is stationary or pseudo stationary and when the operator controlled HPPLMN search period is set to a low value. In the case where the HPPLMN search period is set to 6 minutes per scan, the number of scans can be reduced from 240 in the first 24 hours to 1 for a stationary user. If the HPPLMN search period is set to 60 minutes, then the number of scans in the first 24 hours is reduced from 24 to 1 for a stationary user. Other advantages exist.

Although certain example apparatus, methods, and articles of manufacture are described herein, other implementations are possible. For example, it is possible to store an indication in the mobile station 102 or the SIM 136 to enable or disable the usage of the search inhibit list functionality described herein. Additionally, while the search inhibit list 124 is described in the examples herein as pertaining to searches for higher prioritized networks or searches for (E)HPLMNs, the search inhibit list described herein is not limited as such and could be applied to any scenario wherein searching is not conducted due to the fact that prior search results are available. Further, while the foregoing examples described the list as a search inhibit list including information that causes the mobile station 102 to forebear from searching, a search list may be used, wherein the search list includes information indicating that searching should be carried out. Moreover, while the CGI is described herein as being the indication that is stored in the search inhibit list, other information may be stored. For example, any one or any suitable combination of MCC, MNC, LAI, and CI could be stored rather than storing the CGI.

The scope of coverage of this patent is not limited to the specific examples described herein. On the contrary, this patent covers all apparatus, methods, and articles of manufacture falling within the scope of the invention.

What is claimed is:

1. A method performed by a mobile device related to public land mobile network (PLMN) selection, the method comprising:

registering with a visited PLMN;

determining whether a priority search inhibit list includes a cell global identity of a serving cell;

dependent at least in part on determining that the priority search inhibit list does not include the cell global identity of the serving cell and dependent at least in part on a priority search period, searching for a second PLMN having a higher priority than the visited PLMN; and dependent at least in part on the searching being unsuccessful, adding the cell global identity of the serving cell to the priority search inhibit list.

2. The method of claim 1, wherein the mobile device refrains from attempting a search for a second PLMN while on the serving cell for as long as the priority search inhibit list includes the cell global identity of the serving cell.

3. The method of claim 1, wherein it is determined that the priority search inhibit list does include the cell global identity of the serving cell and dependent at least in part on that determination, refraining from searching for a second PLMN having a higher priority than the visited PLMN while on the serving cell for as long as the priority search inhibit list includes the cell global identity of the serving cell.

4. The method of claim 1, wherein the user equipment has an equivalent home PLMN list and/or has a home PLMN entry, the visited PLMN being different from the home PLMN and/or being different than any equivalent home PLMN on the equivalent home PLMN list.

5. The method of claim 4, wherein the user equipment has a user controlled PLMN list and/or an operator controlled PLMN list, the searching for a second PLMN being further dependent at least in part on the visited PLMN having a lower priority than a highest priority PLMN on the user controlled PLMN list and/or the operator controlled PLMN list.

6. The method of claim 1, further comprising removing or deleting a cell global identity record from the priority search inhibit list.

7. The method of claim 6, wherein the removing or deleting the cell global identity of the serving cell from the priority search inhibit list is dependent at least in part on at least one of an update to the user controlled PLMN list and/or operator controlled PLMN list;

an update to the user controlled PLMN list and/or operator controlled PLMN list, the updated user controlled PLMN list and/or the updated operator controlled PLMN list including the VPLMN;

receiving an instruction from a network;

receiving a manual instruction;

receiving an instruction from the SIM card or UICC;

a validity timer; or a removal of a SIM card or UICC.

8. The method of claim 1, further comprising clearing or deleting the entire priority search inhibit list.

9. The method of claim 8, wherein clearing or deleting the entire priority search inhibit list is dependent at least in part on at least one of registering with the HPLMN or the (E)HPLMN;

changing RPLMN's;

a power cycle of the mobile equipment;

receiving an instruction from a network;

receiving a manual instruction;

a flag changed to a value indicating that the priority search inhibit list should not be utilized by the mobile equipment;

receiving an instruction from the SIM card or UICC;

a validity timer; or a removal of a SIM card or UICC.

10. The method of claim 1, further comprising disabling the use of the priority search inhibit list based on a flag.

11. The method of claim 1, wherein the cell global identity includes a mobile country code of the visited PLMN, a mobile network code of the visited PLMN, a location area identity, and a cell identity.

12. The method of claim 1, wherein adding the cell global identity of the serving cell to the priority search inhibit list comprises determining that a number of searches from the serving cell have been unsuccessful.

13. The method of claim 1, wherein adding the cell global identity of the serving cell to the priority search inhibit list further includes adding a PLMN identification for each PLMN found from the searching.

14. The method of claim 13, further comprising removing or deleting a cell global identity record from the priority search inhibit list.

15. The method of claim 14, wherein the removing or deleting of the cell global identity record is dependent at least in part on determining that an update to the user controlled PLMN list and/or operator controlled PLMN list pertains to a PLMN associated with the cell global identity record on the priority search inhibit list.

16. The method of claim 1, wherein the determining whether a priority search inhibit list includes the cell global identity of the serving cell is dependent at least in part on a flag indicating that the priority search inhibit list can be utilized by the mobile equipment.

17. The method of claim 1, wherein the searching for a second PLMN having a higher priority than the visited PLMN is successful and the mobile device registers with the second PLMN.

18. A method performed by a mobile device related to public land mobile network (PLMN) selection, the method comprising:

registering with a visited PLMN;

determining whether a search inhibit list includes a cell global identity of a serving cell;

dependent at least in part on determining that the search inhibit list does not include the cell global identity of the serving cell and dependent at least in part on a priority search period, searching for a second PLMN having a higher priority than the visited PLMN; and dependent at least in part on the searching being unsuccessful with respect to a home PLMN or an equivalent home PLMN, adding the cell global identity of the serving cell to the search inhibit list and refraining from attempting a further search for a second PLMN having a higher priority than the visited PLMN while on the serving cell for as long as the search inhibit list includes the cell global identity of the serving cell.

19. The method of claim 18, wherein the mobile device refrains from attempting a search for a second PLMN while on the serving cell for as long as the priority search inhibit list includes the cell global identity of the serving cell.

20. The method of claim 18, wherein it is determined that the priority search inhibit list does include the cell global identity of the serving cell and dependent at least in part on that determination, refraining from searching for a second PLMN having a higher priority than the visited PLMN while on the serving cell for as long as the priority search inhibit list includes the cell global identity of the serving cell.

21. The method of claim 18, wherein the user equipment has an equivalent home PLMN list and/or has a home PLMN entry, the visited PLMN being different from the home PLMN and/or being different than any equivalent home PLMN on the equivalent home PLMN list.

22. The method of claim 21, wherein the user equipment has a user controlled PLMN list and/or an operator controlled PLMN list, the searching for a second PLMN being further dependent at least in part on the visited PLMN having a lower priority than a highest priority PLMN on the user controlled PLMN list and/or the operator controlled PLMN list.

23. The method of claim 18, further comprising removing or deleting a cell global identity record from the priority search inhibit list.

24. The method of claim 23, wherein the removing or deleting the cell global identity of the serving cell from the priority search inhibit list is dependent at least in part on at least one of an update to the user controlled PLMN list and/or operator controlled PLMN list;

an update to the user controlled PLMN list and/or operator controlled PLMN list, the updated user controlled PLMN list and/or the updated operator controlled PLMN list including the VPLMN;

receiving an instruction from a network;

receiving a manual instruction;

receiving an instruction from the SIM card or UICC;

a validity timer; or a removal of a SIM card or UICC.

25. The method of claim 18, further comprising clearing or deleting the entire priority search inhibit list.

26. The method of claim 25, wherein clearing or deleting the entire priority search inhibit list is dependent at least in part on at least one of registering with the HPLMN or the (E)HPLMN;

changing RPLMN's;

a power cycle of the mobile equipment;

receiving an instruction from a network;

receiving a manual instruction;

a flag changed to a value indicating that the priority search inhibit list should not be utilized by the mobile equipment;

receiving an instruction from the SIM card or UICC;

a validity timer; or a removal of a SIM card or UICC.

27. The method of claim 18, further comprising disabling the use of the priority search inhibit list based on a flag.

28. The method of claim 18, wherein the cell global identity includes a mobile country code of the visited PLMN, a mobile network code of the visited PLMN, a location area identity, and a cell identity.

29. The method of claim 18, wherein adding the cell global identity of the serving cell to the priority search inhibit list comprises determining that a number of searches from the serving cell have been unsuccessful.

30. The method of claim 18, wherein adding the cell global identity of the serving cell to the priority search inhibit list further includes adding a PLMN identification for each PLMN found from the searching.

31. The method of claim 30, further comprising removing or deleting a cell global identity record from the priority search inhibit list.

32. The method of claim 31, wherein the removing or deleting of the cell global identity record is dependent at least in part on determining that an update to the user controlled PLMN list and/or operator controlled PLMN list pertains to a PLMN associated with the cell global identity record on the priority search inhibit list.

33. The method of claim 18, wherein the determining whether a priority search inhibit list includes the cell global identity of the serving cell is dependent at least in part on a flag indicating that the priority search inhibit list can be utilized by the mobile equipment.

34. The method of claim 18, wherein the searching for a second PLMN having a higher priority than the visited PLMN is successful and the mobile device registers with the second PLMN.

35. A tangible computer readable storage device or storage disk comprising computer readable instructions which, when executed, cause a mobile device to at least:

register with a visited PLMN;

determine whether a priority search inhibit list includes a cell global identity of a serving cell;

dependent at least in part on determining that the priority search inhibit list does not include the cell global identity of the serving cell and dependent at least in part on a priority search period, searching for a second PLMN having a higher priority than the visited PLMN; and dependent at least in part on the searching being unsuccessful, adding the cell global identity of the serving cell to the priority search inhibit list.

36. A computer readable storage device or storage disk as defined in claim 35, wherein the instructions are further to cause the mobile device to remove or delete a cell global identity record from the priority search inhibit list.

37. A computer readable storage device or storage disk as defined in claim 35, wherein the instructions are to cause the mobile device to add the cell global identity of the serving cell to the priority search inhibit list by adding a PLMN identification for each PLMN found from the searching.

38. A tangible computer readable storage device or storage disk comprising computer readable instructions which, when executed, cause a mobile device to at least:

register with a visited PLMN;

determine whether a search inhibit list includes a cell global identity of a serving cell;

dependent at least in part on determining that the search inhibit list does not include the cell global identity of the serving cell and dependent at least in part on a priority search period, searching for a second PLMN having a higher priority than the visited PLMN; and dependent at least in part on the searching being unsuccessful with respect to a home PLMN or an equivalent home PLMN, adding the cell global identity of the serving cell to the search inhibit list and refraining from attempting a further search for a second PLMN having a higher priority than the visited PLMN while on the serving cell for as long as the search inhibit list includes the cell global identity of the serving cell.

39. A computer readable storage device or storage disk as defined in claim 38, wherein the instructions are to cause the mobile device to refrain from attempting a search for a second PLMN while on the serving cell for as long as the priority search inhibit list includes the cell global identity of the serving cell.

* * * * *